E. S. DE TAMBLE.
PEDAL CAP.
APPLICATION FILED FEB. 18, 1920.
1,388,935. Patented Aug. 30, 1921.
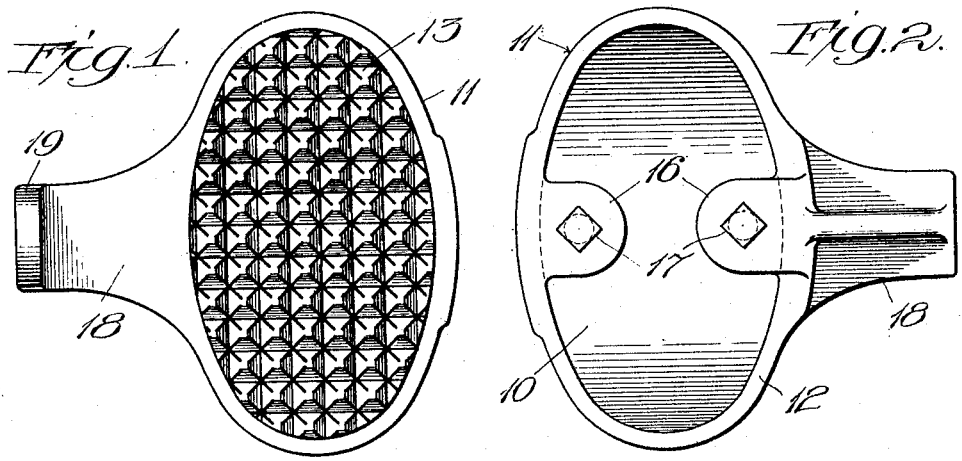
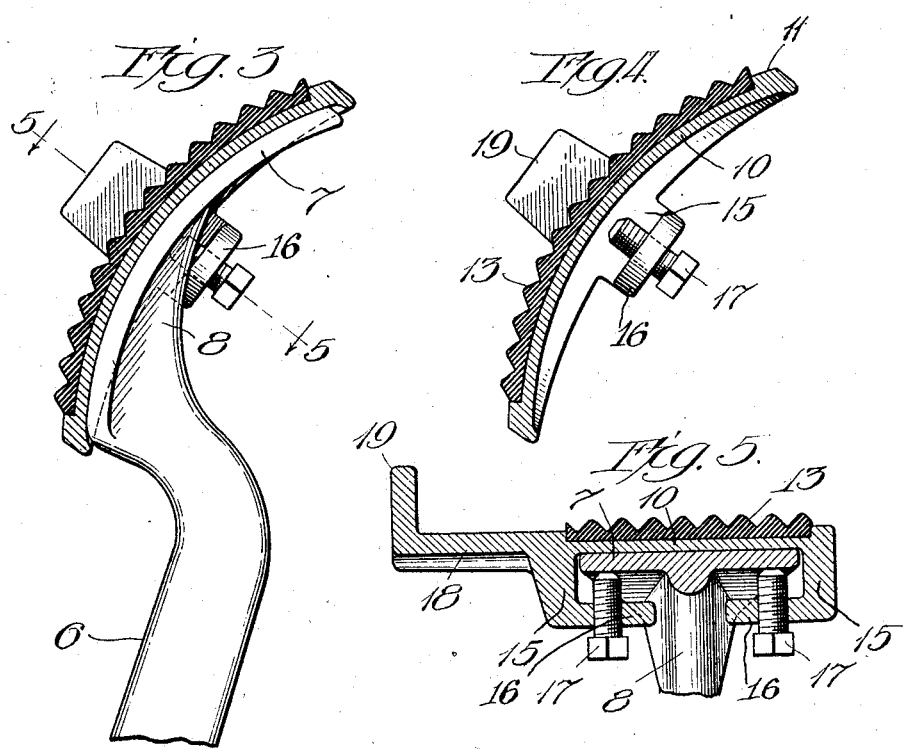
Inventor:
Edward S. DeTamble

UNITED STATES PATENT OFFICE.

EDWARD S. DE TAMBLE, OF CHICAGO, ILLINOIS, ASSIGNOR TO RACINE ACCESSORIES MANUFACTURING CO., OF RACINE, WISCONSIN, A CORPORATION OF WISCONSIN.

PEDAL-CAP.

1,388,935.   Specification of Letters Patent.   Patented Aug. 30, 1921.

Application filed February 18, 1920. Serial No. 359,623.

*To all whom it may concern:*

Be it known that I, EDWARD S. DE TAMBLE, a citizen of the United States, residing at Chicago, in the county of Cook and State of Illinois, have invented certain new and useful Improvements in Pedal-Caps, of which the following is a specification.

This invention relates to a pedal attachment in the nature of a cap, the device being applicable, for example, to the control pedals of a Ford automobile.

It has been my aim in this invention to produce an appliance that may be attached in place without requiring any work to be done upon the pedal; to provide means for quickly and easily securing the attachment in place; to so construct the attachment that it will tend to remain in place even though the screw fastening means become loose; to construct the attachment with a lateral extension so as to afford a widened surface on which the foot may rest; to so arrange the various parts of the attachment in their relation to the pedal that the device may be secured in place with the lateral extension disposed to either side of the pedal, thereby rendering the attachment serviceable for either right or left foot pedals; and generally to provide a construction which is neat, inexpensive, and effective for the purposes intended. With these and other objects in mind, I will now proceed to a detailed explanation of this invention wherein reference is made to the accompanying drawing which exhibits a preferred embodiment thereof in the manner following:

Figure 1 is a plan view of the device;

Fig. 2 is a view looking toward its rear or under side;

Fig. 3 is a sectional view taken longitudinally of the attachment; the pedal to which it is secured being shown in elevation;

Fig. 4 is a similar view with the pedal omitted; and

Fig. 5 is a transverse section taken on line 5—5 of Fig. 3.

The pedal shown in Figs. 3 and 5 comprises the usual shank or arm 6 on which is mounted a tread plate 7 that derives reinforcement from a web 8, all as is common with devices of this general character. In pedals such as are employed on the controls of a Ford automobile, the tread plate is in the general form of an ellipse and is also curved or arched longitudinally. It is with a pedal of such construction that the present attachment is designed particularly to coöperate.

As shown in the drawings the device of my invention includes a body in the form of an elliptical plate 10 curved or arched from end to end in conformity with the tread plate 7, and having upper and lower marginal flanges 11 and 12 respectively, each of which defines a panel. Within the panel on the upper or face side of the device may be secured a pad 13 of rubber, cork or any other suitable material affording a desirable surface for the foot to rest upon. The lower flange 12 preferably depends below the plate 10 for the greatest distance in the region of the side centers, as best indicated in Fig. 4, and in the region of the end centers depends below the plate 10 for only a relatively slight distance, the result being that the panel thus defined by the flanges 12 is rendered shallow at its ends and deep in its center. The device thus constructed is adapted to fit like a cap upon the tread plate of a pedal formed as above described, the marginal flange 12 closely surrounding the tread plate to prevent sliding or turning movements thereupon.

In the center of each side is provided a lug 15 depending below the flange 12 and terminating in an inwardly extending lip 16 that is adapted to lie beneath the tread plate 7 in spaced relation thereto. The two lips 16 extend toward each other and are each formed with a threaded opening in which is received a set screw 17 adapted to be advanced against the under side of the pedal to thereby tighten the attachment in place.

From one of the lugs 15 is extended laterally an arm 18 having at its end an upturned lip 19, this arm affording a widened surface on which the foot may rest without danger of slipping off. Obviously the attachment may be secured to the pedal either way around so as to dispose the extension arm to either side thereof.

In practice the present device may be made of cast or stamped metal, the construction shown in the drawing being illustrative of the former. To place the appliance on the pedal the set screws are withdrawn a required distance wherepon the device may be slipped over the pedal by an endwise movement. During this operation relative movement takes place between the tread plate and the edge of the lower marginal flange 12, but mainly at one end thereof where the flange depends from the body 10 for the least distance, the consequence being that the tread plate is required to approach closely to the two lips 16; these latter elements, however, are spaced away from the body 10 a sufficient distance to afford clearance for the movement just described. When the attachment is in place, its lower flange completely surrounds the tread plate 7 so as to self-center the device upon the pedal. Thereafter the set-screws are turned to tighten the appliance securely in place.

The attachment which I have herein described is not only ornamental and neat to a high degree, but it represents practically an integral construction requiring no assembly of parts, some of which might, under certain conditions, become separated from the others. In use, it is maintained in operative position upon the pedal not only by means of the set-screws but also by the depending marginal flanges which serve to hold the device in place even when the screw fastening means may have become loosened.

I claim:

1. In combination with a pedal having an elongated tread plate arched from end to end, an attachment therefor comprising a cap plate shaped to closely overlie the tread plate and provided with a depending marginal flange adapted to surround the edges of the tread plate, the marginal flange being extended from the cap plate for a greater distance in the region of its side centers whereby the panel formed on the under side of the cap plate is relatively deep in the center and relatively shallow at its ends, a lug depending from near the center of each side of the cap plate, an inturned lip carried by each lug adapted to underlie the tread plate in spaced relation thereto, and screw means carried by said lips adapted for clamping against the underside of the tread plate for tightening the cap plate upon the pedal, substantially as described.

2. In combination with a pedal having an elongated tread plate, an attachment therefor comprising a cap plate shaped to fit over the tread plate and provided with a depending marginal flange adapted to surround the edges of the tread plate, a lug extending from near the center of each side of the cap plate and provided with an inturned lip which underlies the tread plate in spaced relation therefrom a distance sufficient to permit the cap plate to slide on or off the tread plate when moved longitudinally thereof, and screw means carried by each lip adapted to clamp against the under side of the tread plate for tightening the cap plate upon the pedal, substantially as described.

3. In combination with a pedal having an elliptical tread plate arched from end to end, a cap plate shaped to overlie the tread plate and provided with a depending marginal flange adapted to surround the edges of the tread plate such that the cap plate is prevented from sliding or turning thereon, the marginal flange depending from the cap plate for only a slight distance at its ends, and having near the center of each side a depending lug formed with an inwardly extending lip that underlies the tread plate, each lip being spaced from the tread plate a distance therefrom just sufficient to afford clearance for endwise sliding movements of the cap plate over the tread plate, and screw means carried by each lip adapted to be clamped against the underside of the tread plate for tightening the cap plate upon the pedal, substantially as described.

4. In combination with a pedal having a tread plate of generally elliptical form arched from end to end, a cap attachment therefor comprising a plate shaped in conformity with the tread plate and adapted to overlie the same, a marginal flange depending from the cap plate in surrounding relation to the edges of the tread plate, an element depending from near the center of one side of the cap plate in underlying relation to the tread plate and carrying screw means adapted for clamping against the underside of the tread plate to tighten the cap thereon, said element underlying the tread plate a distance sufficient to permit the cap plate to be moved endwise on or off the tread plate only when the screw means are withdrawn from operative position, substantially as described.

EDWARD S. DE TAMBLE.

Witness:
EPHRAIM BANNING.